July 3, 1962  J. C. PIRTLE ETAL  3,042,349
REMOVABLE AIRCRAFT ENGINE MOUNTING ARRANGEMENT
Filed Nov. 13, 1959
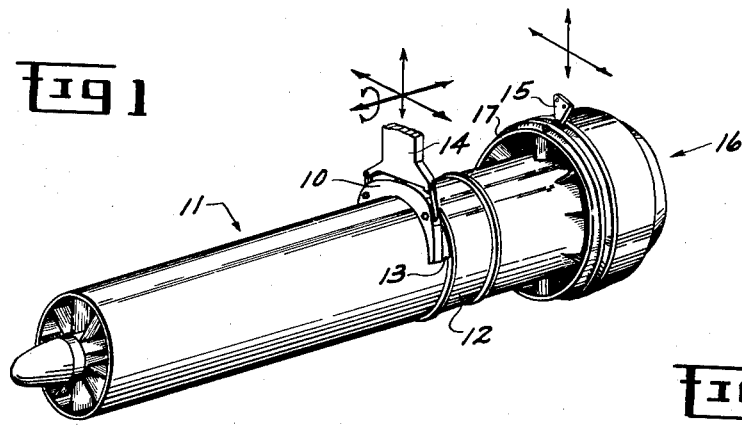
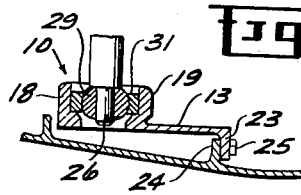
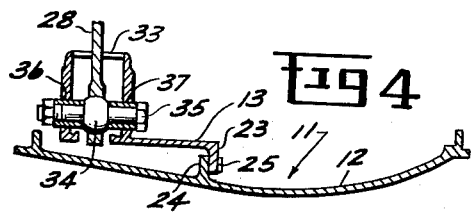
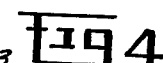
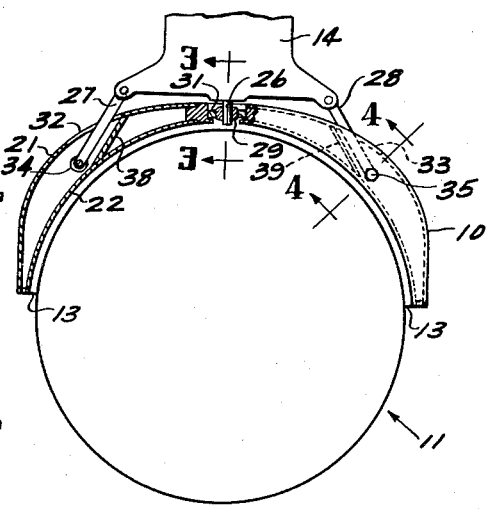
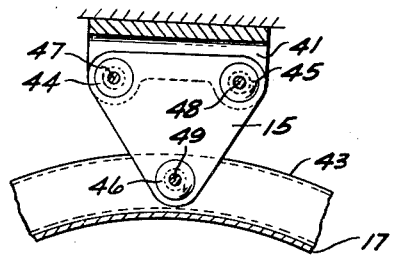
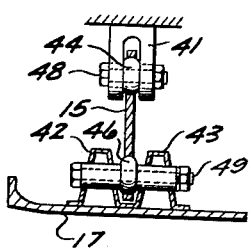
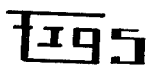
INVENTORS,
THOMAS L. HAMPTON
JOHN C. PIRTLE
BY
ATTORNEY

United States Patent Office 3,042,349
Patented July 3, 1962

3,042,349
REMOVABLE AIRCRAFT ENGINE MOUNTING ARRANGEMENT
John C. Pirtle and Thomas L. Hampton, Cincinnati, Ohio, assignors to General Electric Company, a corporation of New York
Filed Nov. 13, 1959, Ser. No. 852,883
2 Claims. (Cl. 248—5)

The present invention relates to a mounting arrangement for reaction-type aircraft propulsion engines and more specifically to a readily removable mounting arrangement particularly suitable for turbofan engines.

Turbojet aircraft engines have in the past been provided with a variety of mounting arrangements intended to support the engine and resist the various loads encountered by the engine during its use. Provision has been made in some instances for varying the mounting arrangement depending upon the particular airframe in which the engine is to be installed. These mounting arrangements have been successful for turbojet use, but the advent of fan components, front or rear, with which an existing turbojet can be converted to a turbofan have created hitherto unfaced problems in mounting the engine. These problems have derived in part from the increased size of the fan component and the need for axially-extending fan air ducts along the outer surface of the engine. These considerations, along with the desirability of having a mounting arrangement which is independent of and removable from the basic engine, have severely limited the design choice as well as the number of circumferential and axial sectors of the engine available for mounting purposes.

The object of the present invention is to provide a mounting arrangement suitable for application to and removal from an existing engine with a minimum of changes in the engine structure.

The present invention comprehends a mounting arrangement which is rigidly secured to an engine in a single transverse plane and pivotally connected to the engine at a point axially spaced from the rigid connection. In the mounting arrangement a saddle-like box structure extends around a portion of the circumference of the engine and is secured to the engine and isolated thermally therefrom by means of a thin arcuate web. This mounting arrangement also includes a link pivotally connected to the engine at a point which is axially removed from and aligned with the center of the box structure. Axial, side, vertical and torsional loads are resisted through the box by means of tangential links and a thrust pin while vertical and side loads are resisted through the pivoted link.

Other objects and many of the attendant advantages of this invention will be readily appreciated as the same becomes better understood by reference to the following detailed description when considered in connection with the accompanying drawing wherein:

FIG. 1 is a perspective view showing the present mounting arrangement applied to a gas turbine engine having a post turbine fan component;

FIG. 2 is a front elevational view partly in section of the forward mount;

FIGS. 3 and 4 are sectional views along lines 3—3 and 4—4 respectively of FIG. 2 and;

FIGS. 5 and 6 are front and side elevation views respectively of the rear mount.

Referring more particularly to FIG. 1, the forward mount, which is a saddle-like box structure 10, is secured to an engine 11 in the region of the compressor rear frame 12 by means of a thin arcuate web 13. The box structure 10 is secured to a portion of a pylon structure 14 which is adapted to be rigidly connected to the frame of an aircraft. The box structure can be dimensioned to underlie the fan air ducts (not shown) which extend axially along the outer surface of the engine. This arrangement permits the engine to be secured to the airframe essentially in a single axial plane, such as along the top center line of the engine. The rear mount consists of a link 15 which is pivotally connected at one end to the engine fan component 16 in the area of the forward frame 17. The opposite end of link 15 is adapted to be secured to the aircraft frame. The engine frames are logical choices for attachment of the mounts since they are main structural members of the engine. In this connection, both the compressor rear frame and the fan front frame have radial struts which provide rigidity and strength for resisting engine loads.

As illustrated in FIGS. 2–4, the saddle-like box structure 10 is a semi-cylindrical member which extends around approximately 50% of the circumference of the engine. The box structure is provided to spread the engine loads around the compressor rear frame and avoid a high concentration of loads at any one particular point. The box structure includes side members 18, 19 and top and bottom members 21 and 22 all welded, or otherwise secured together to form a hollow beam. This beam or box is secured to the engine such that it can absorb thermal expansion and can be attached without major structural changes in the engine. This is accomplished by anchoring the box to the engine in a single transverse plane in order to eliminate axial thermal expansion problems due to differential expansion between the engine and the mount. A thin arcuate web 13 extends rearwardly from the box structure (as shown in FIGS. 3 and 4) and permits the box to be located in a section of the engine which is relatively free from accessories and parts having a high replacement rate. The web 13 is provided at its rearward extremity with a flange 23 which can be removably secured to a flange 24 on the rear compressor frame, such as by bolts 25. If a particular engine application permits, the web may be incorporated in the box structure with the box straddling the flange 23. Web 13 can be welded or otherwise secured to the box structure or it can be an integral extension of the bottom member 22. The web is required to be stiff enough to transmit the mutual loads between the engine and the airframe, but must also be thin enough to permit the engine to expand radially relative to the box structure. This permits any radial thermal differentials between the box and the engine to be accommodated by bending or flexing of the web. Pylon structure 14 is connected to the box structure by means of a radially extending thrust pin 26 and pivotally mounted links 27 and 28. The thrust pin 26 is received within and extends through a ball bearing 29 which is mounted for rotational movement within a race 31. The race is in turn positioned within the box structure at the center line of the box structure. Axial loads and any other loads normal to the thrust pin, i.e. side loads in the arrangement illustrated, are transmitted from the engine to the airframe through this single radial ball joint. Links 27 and 28 extend in opposite directions from pylon structure 14 to react vertical and side loads and stabilize the engine in roll. The fact that the links approach the box in approximately a tangential manner allows the engine loads to be transmitted from flange 24 through the arcuate web and box to the airframe with very little radial deflection of the box. The links are received within openings 32 and 33 in the upper surface of the box and are pivotally connected to the sides of the box to avoid any local moments due to misalignment. As shown in FIG. 4 a ball bearing 34 is mounted in the inner end of each link, a bolt or similar means 35 extends through the ball bearing 34 and the opposite sides of the box structure. Bosses 36 and 37 are secured to the sides of the box 35 on opposite sides of bearing 34 to center the link within the box structure and transmit loads from the box, through the bolt to the link. Plates 38 and 39 are rigidly secured within the box adjacent openings 32 and 33 to stabilize the box structure against torsion.

The box structure is made as stiff as possible against an axial load and since the bearing 29 is offset radially from the web 13, the box is also required to be rigid in torsion. The box will, however, bend and twist to some degree under the application of large axial loads. To withstand axial bending and torsion the box structure and the web are thickened or "beefed up" in the rear of the top ball joint. As a result a portion of the stress load on the ball joint will be distributed circumferential in the box and the web on either side of the bearing.

As shown in FIGS. 5 and 6, the rear mount is a triangular link 15 which is hangedly connected to the aircraft frame and pivotally connected at a single point to the front frame of the fan component. A clevis member 41 is secured to the aircraft frame and re-inforcing ribs or flanges 42 and 43 are secured to the front frame of the fan component. Ball bearings 44, 45 and 46 are secured to the link at each point of connection and bolts 47, 48 and 49 pass through the respective ball bearings and secure the link to the clevis and re-inforcing ribs. This arrangement permits the link to be freely displaced in an axial direction, either by thrust loads or thermal expansion of the engine without the transfer of any axial loading at this point. The three point attachment of the triangular link causes a truss action which resists displacement in a transverse or vertical direction. Accordingly, side and vertical loads are transmitted from the engine to the airframe at this mount. This same result could be obtained in other ways, such as by substituting a conventional hinged joint for the bearings 44, 45 and bolts 47 and 48.

While the present mounting arrangement has been illustrated as applied to the top center line of an engine its location can be varied for different engine applications. In this regard, the mounting arrangement can be attached to any portion of the circumference of an engine as long as the front and rear mounts are axially aligned.

Obviously, many modifications and variations of the present invention are possible in the light of the above teachings. It is, therefore, to be understood that within the scope of the appended claims, the invention may be practiced otherwise than as specifically described.

What we claim as our invention is:

1. In a mounting arrangement for supporting an engine from an airframe,
    a mount including:
    a thin, arcuate web having one edge attached to said engine in one transverse plane,
    said web extending less than half way around said engine and generally parallel with the engine,
    a ball joint support means attached to said web near the mid point and axially spaced from the transverse plane to which the airframe may be attached to resist axial and vertical loads,
    a pair of links connected to said airframe and extending generally tangentially to said engine,
    each link connected to said web by a pivotal joint on either side of said ball joint means to resist vertical and side loads while allowing free axial expansion of the engine.

2. In a mounting arrangement for supporting an engine from an airframe,
    a mount including:
    a thin, arcuate web having one edge attached to said engine in one transverse plane,
    said web extending less than half way around said engine and generally parallel with the engine,
    a ball joint support means attached to said web near the mid point and axially spaced from the transverse plane to which the airframe may be attached to resist axial and vertical loads,
    a pair of links connected to said airframe and extending generally tangentially to said engine,
    each link connected to said web by a pivotal joint on either side of said ball joint means to resist vertical and side loads while allowing free axial expansion of the engine,
    a second support means connected to the engine through a pivotal joint at a point axially spaced from the ball joint support means to resist vertical and side loads while allowing for axial expansion of the engine.

References Cited in the file of this patent

UNITED STATES PATENTS

| 2,936,978 | Lauck | May 17, 1960 |
| 2,949,268 | Eggers | Aug. 16, 1960 |
| 3,006,587 | Jumelle | Oct. 31, 1961 |

FOREIGN PATENTS

| 1,052,253 | Germany | Mar. 5, 1959 |